United States Patent [19]

Evans

[11] Patent Number: 5,622,294

[45] Date of Patent: Apr. 22, 1997

[54] GOLF CART TOWING BELT

[75] Inventor: Robert Evans, Morris Plains, N.J.

[73] Assignee: Robert E. Evans, Morris Plains, N.J.

[21] Appl. No.: 506,355

[22] Filed: Jul. 24, 1995

[51] Int. Cl.$^6$ .............................. B62D 51/04; A45F 3/14
[52] U.S. Cl. .......................... 224/184; 224/251; 224/678; 280/1.5; 280/DIG. 6
[58] Field of Search ................................. 224/184, 251, 224/660, 678; 280/1.5, 3, DIG. 6, 47.26

[56] References Cited

U.S. PATENT DOCUMENTS

| | | | |
|---|---|---|---|
| 2,559,981 | 7/1951 | McBride | 224/184 |
| 3,311,385 | 3/1967 | Frantz | 280/1.5 |
| 3,328,043 | 6/1967 | Johnson | 280/1.5 |
| 3,926,448 | 12/1975 | Reichard | 280/1.5 |
| 4,037,765 | 7/1977 | Slayman | 224/25 R |
| 5,215,318 | 6/1993 | Capraro | 280/1.5 |
| 5,215,355 | 6/1993 | Klumpjan | 298/6 |
| 5,244,217 | 9/1993 | Kotulla | 280/1.5 |
| 5,265,891 | 11/1993 | Diehl | 280/1.5 |

FOREIGN PATENT DOCUMENTS

| | | | |
|---|---|---|---|
| 990271 | 4/1965 | United Kingdom | 280/DIG. 6 |
| 1461930 | 1/1977 | United Kingdom | 280/1.5 |
| 2227987 | 8/1990 | United Kingdom | 280/1.5 |

Primary Examiner—Henry J. Recla
Assistant Examiner—Gregory M. Vidovich

[57] ABSTRACT

A golf cart towing device adaptable to the waist of a user that includes a belt, an adjusting ring, a buckle female portion, a buckle male portion, a tube, and an elastic strip. The belt has an outer surface, an inner surface, and first and second distal ends. The adjusting ring has an inner post and an outer post that defines a slot therebetween throughwhich the belt passes. The buckle female portion contains a slot through which the belt first distal end passes. The buckle male portion has a male portion body that contains an inner slot, an outer slot, and a partition. The belt second distal end passes through the buckle male portion inner slot, around the buckle male portion partition, through the buckle male portion outer slot, around the adjusting ring outer post and is secured therearound. The tube is horizontally positioned at the belt outer surface intermediate the belt first distal end and the belt second distal end and is movable therefrom. The tube removably receives the handle of a golf cart. And, the elastic strip has a first distal end and a second distal end. The elastic strip passes freely through the robe with the elastic strip first distal end and the elastic strip second distal end attached to the belt outer surface so that the tube which removably receives the handle of a golf cart prevents a force encountered by the golf cart from being transmitted to the user.

14 Claims, 2 Drawing Sheets

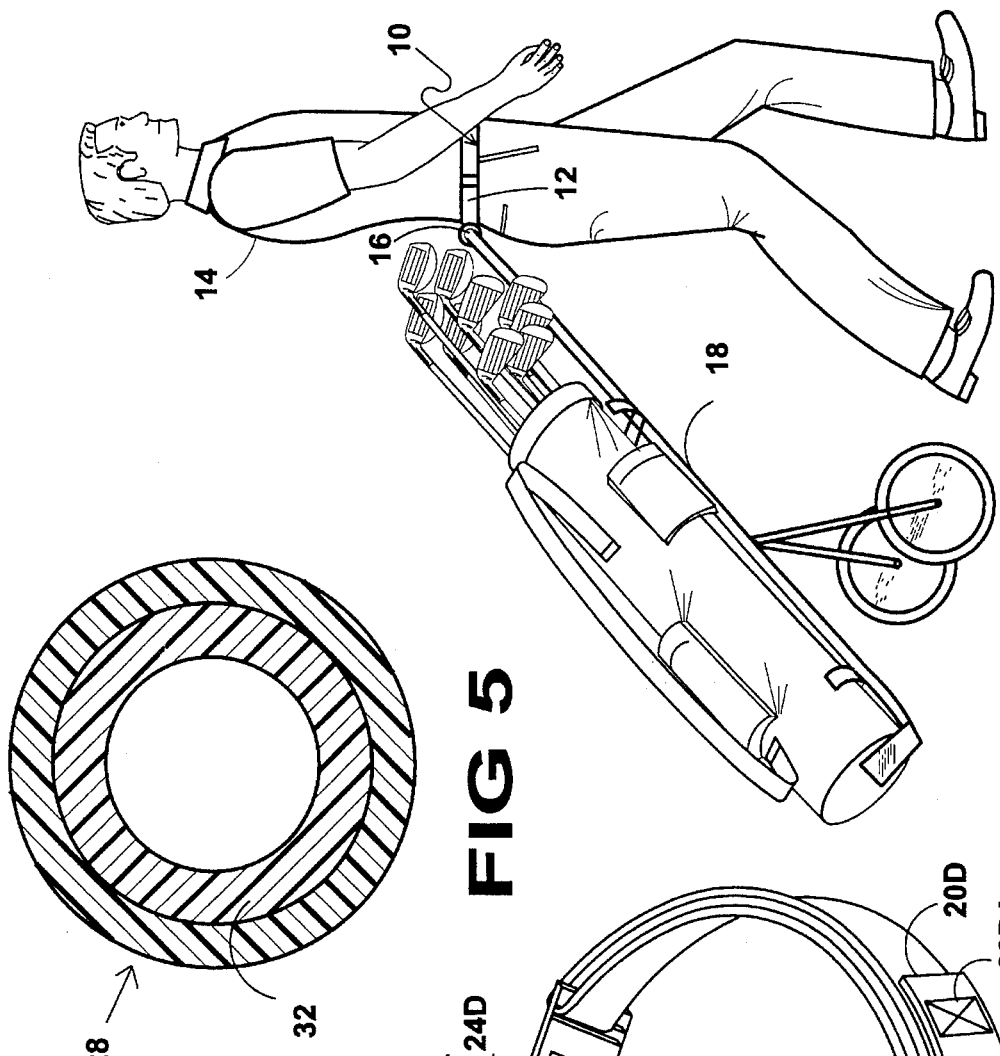
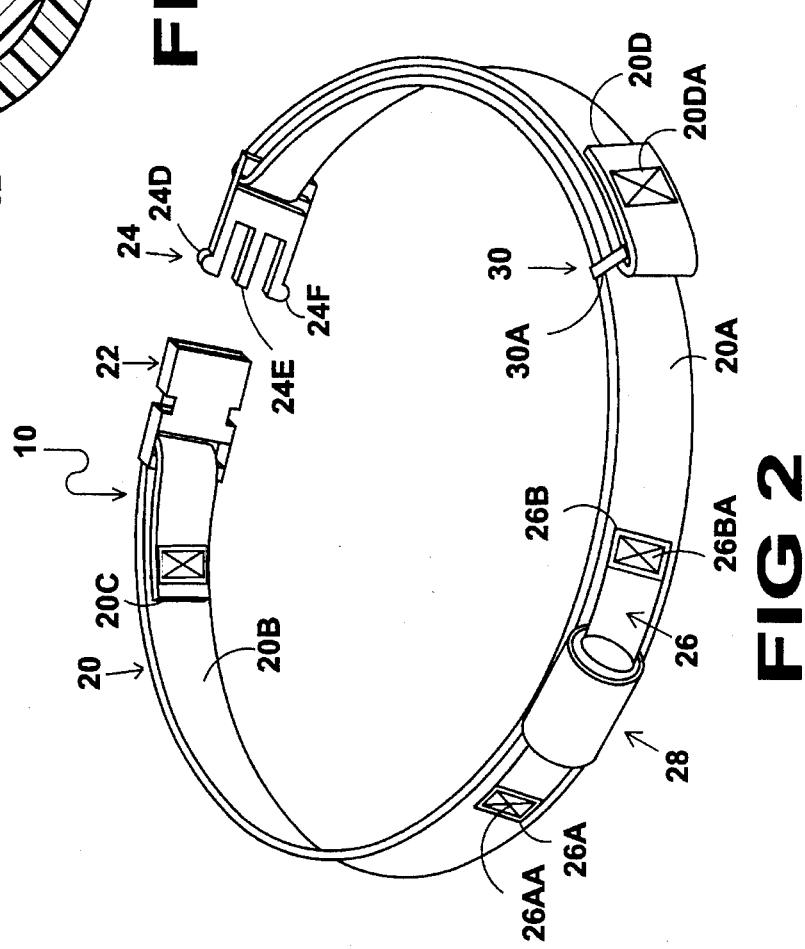

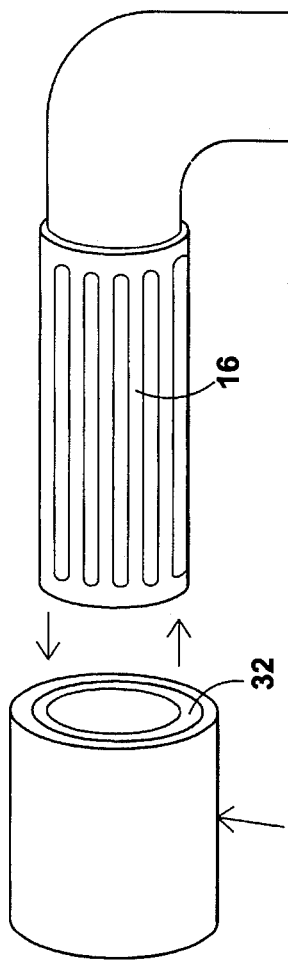
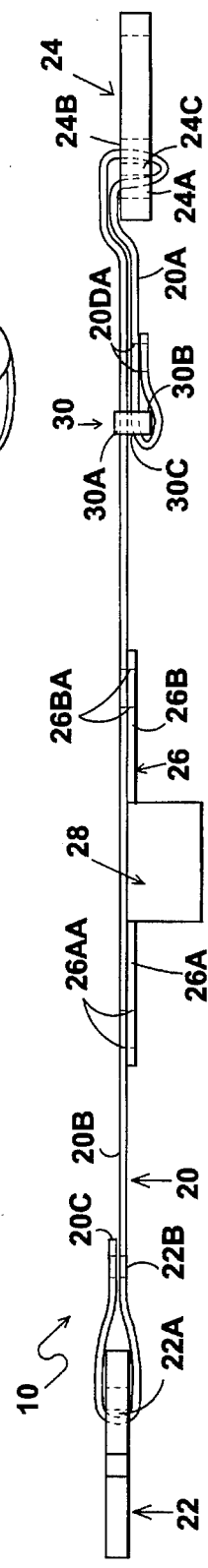
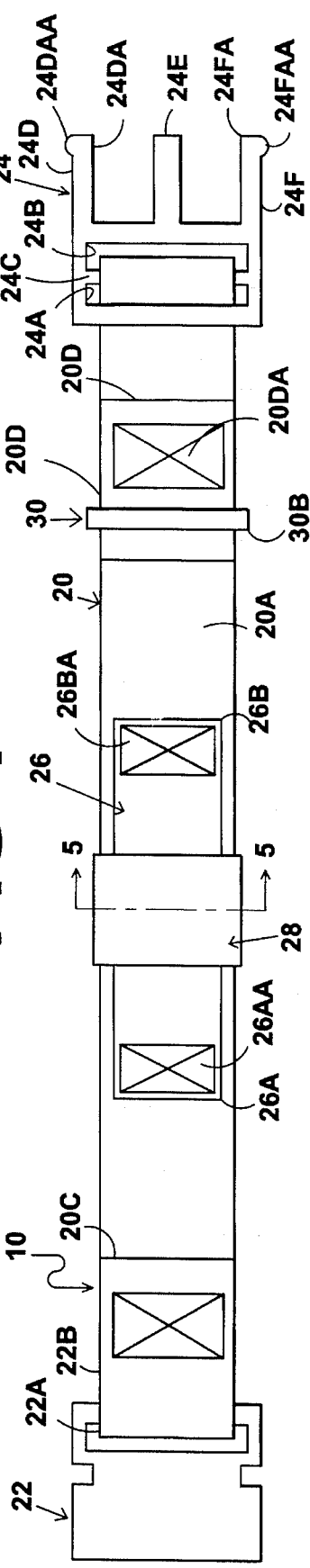

GOLF CART TOWING BELT

BACKGROUND OF THE INVENTION

1. Field Of The Present Invention

The present invention relates to a golf cart towing device. More particularly, the present invention relates to a golf cart towing device that includes an adjustable belt latchably adaptable around the waist of a user, a horizontally positioned tube disposed at the rear of the belt for removably receiving the handle of a golf cart, and an elastic strap disposed at the rear of the belt and traversing the tube for elastically affixing the tube to the rear of the belt.

2. Description Of The Prior Art

Golf is a popular sport, both for the thrill and satisfaction of doing well at the sport, as well as the exercise that is available to the golfer. While many golfers ride in electric or gas-powered carts about the course, thus largely defeating the available exercise, others forego the cart and choose to either carry their bag of golf clubs, have the golf clubs carried by a caddy, or tow the golf clubs behind them in a two wheeled hand pulled golf cart.

Over a golf course having 18 holes of regulation play, a golfer will typically cover over three miles of walking and thus enjoy a fair amount of beneficial aerobic exercise.

When pulling a two wheeled golf cart over such long distances, the golfer's arms can become quite tired from the constant pulling of the can. This fatigue will affect the level of play after several hours on the come. Thus, many golfers will forego the two-wheeled can in favor of a motorized cart so that their arms are not unduly tired by extraneous activity.

Numerous innovations for cart towing devices have been provided in the prior art that will be described. However, even though these innovations may be suitable for the specific individual purposes to which they address, they differ from the present invention in that they do not teach a golf cart towing device that includes an adjustable belt latchably adaptable around the waist of a user, a horizontally positioned tube disposed at the rear of the belt for removably receiving the handle of a golf cart, and an elastic strap disposed at the rear of the belt and traversing the tube for elastically affixing the tube to the rear of the belt.

For Example, U.S. Pat. No. 3,926,448 to Reichard teaches a golf cart that includes a main frame, at least three wheels rotatably mounted to the main frame, a golf bag holding means movably mounted on the frame, and connecting means secured to the main frame and adapted to be attached to hips of a human for pulling the golf cart.

Another examples, U.S. Pat. No. 5,215,355 to Klumpjan teaches a wagon bin is supported above a wheel and axle combination, and a tongue extends outwardly from the axle. A universal joint is provided on the outer end of the tongue. A harness is attached to the universal joint.

Still another example, U.S. Pat. No. 5,244,217 to Kotulla teaches a golf cart pulling device that includes a strap detachably mounted to the handle of a golf cart. A large hoop is formed in the strap extending essentially from the handle of the golf cart over the shoulder of a person pulling the cart.

Yet another example, U.S. Pat. No. 4,037,765 to Slayman teaches a golf club carrier that includes a rigid aluminum frame that is suspended from the shoulders to support cross members to which golf clubs are releasably attached.

Finally, still yet another example, U.S. Pat. No. 5,265,891 to Diehl teaches a frame that mounts a coach member thereon and includes spring means, first and second harness tubes, and a torso harness worn by an individual transporting the carriage structure.

It is apparent that numerous innovations for can towing devices have been provided in the prior an that are adapted to be used. Furthermore, even though these innovations may be suitable for the specific individual purposes to which they address, they would not be suitable for the purposes of the present invention as heretofore described.

SUMMARY OF THE INVENTION

According, an object of the present invention is to provide a golf cart towing device that avoids the disadvantages of the prior art.

Another object of the present invention is to provide a golf cart towing device that is simple and inexpensive to manufacture.

Still another object of the present invention is to provide a golf cart towing device that is simple to use.

Yet another object of the present invention is to provide a golf cart towing device that helps a user pull his golf cart with his body instead of his arms.

Still yet another object of the present invention is to provide a golf cart towing device that reduces stress on the user's shoulders and arms.

Yet still another object of the present invention is to provide a golf cart towing device that makes a round of golf more enjoyable and comfortable.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

FIG. 1 is a perspective view of the golf cart towing device of the present invention being worn around the waist of a user and towing a golf cart;

FIG. 2 is a perspective view of the golf cart towing device of the present invention;

FIG. 3 is a side view of the golf cart towing device of the present invention;

FIG. 4 is a top view of the golf cart towing device of the present invention;

FIG. 5 is a cross sectional view of the tube taken along line 5—5 in FIG. 3; and FIG. 6 is a perspective view illustrating the handle of a golf cart being removably insertably mounted to the present invention.

LIST OF REFERENCE NUMERALS UTILIZED IN THE DRAWING 10-golf cart towing device 12-waist 14-user 16-handle 18-golf cart 20-belt 20A-belt outer surface 20B-belt inner surface
20C-belt first distal end
20D-belt second distal end
20DA-belt second distal end stitches
22-buckle female portion
22A-buckle female portion vertically disposed slot
22B-belt first distal end stitches
24-buckle male portion
24A-buckle male portion inner slot
24B-buckle male portion outer slot
24C-buckle male portion partition
24D-buckle male portion resilient upper leg
24DA-buckle male portion upper leg distal end
24DAA-buckle male portion upper leg distal end lip
24E-buckle male resilient male portion intermediate leg
24F-buckle male portion resilient lower leg
24FA-buckle male portion lower leg distal end
24FAA-buckle male portion lower leg distal end lip
26-elastic strip
26A-elastic strip first distal end
26AA-elastic strip first distal end stitches
26B-elastic strip second distal end
26BA-elastic belt elastic strip second distal end stitches
28-tube
30-adjusting ring
30A-adjusting ring inner post
30B-adjusting ring outer post
30C-adjusting ting slot
32-resilient insert

DETAILED DESCRIPTION OF THE PREFERRED EMBODIMENT

Referring now to the figures, in which like numerals indicate like parts, and particularly to FIG. 1, the golf cart towing device of the present invention is shown generally at 10, worn around the waist 12 of a user 14, and receiving the handle 16 of a golf cart 18 being towed by the user 14.

The configuration of the golf cart towing device 10 can best be seen in FIGS. 2 through 6, and as such will be discussed with reference thereto.

The golf cart towing device 10 includes a belt 20, a buckle female portion 22, a buckle male portion 24, an elastic strip 26, a tube 28, an adjusting ring 30, and a resilient insert 32.

The belt 20 has a belt outer surface 20A, a belt inner surface 20B, a belt first distal end 20C, and a belt second distal end 20D.

The adjusting ring 30 allows for the quick adjustment of the belt 20 to accommodate for different sized waists. The adjusting ring 30 is substantially rectangular in shape and has an adjusting ring inner post 30A and an adjusting ring outer post 30B. The adjusting ring inner post 30A and the adjusting ring outer post 30B define an adjusting ting slot 30C contained therebetween.

The buckle female portion 22 contains a vertically disposed slot 22A through which the belt first distal end 20C passes and is secured to the belt inner surface 20B by belt buckle second distal end stitches 22B.

The buckle male portion 24 contains a buckle male portion inner slot 24A, a buckle male portion outer slot 24B, and a buckle male portion partition 24C separating the buckle male portion inner slot 24A from the buckle male portion outer slot 24B. The belt second distal end 20D passes through the buckle male portion inner slot 24A, around the buckle male portion partition 24C, and back through the buckle male portion outer slot 24B. The belt second distal end 20D then passes around the adjusting ring outer post 30B and is secured thereto by belt second distal end stitches 20DA.

Extending outwardly from the belt buckle male portion 24 and formed as an integral part therewith is a buckle male portion resilient upper leg 24D, a buckle male portion resilient intermediate leg 24E, and a buckle male portion resilient lower leg 24F.

The buckle male portion resilient upper leg 24D has a buckle male portion upper leg distal end 24DA with a buckle male portion upper leg distal end lip 24DAA extending upwardly therefrom. The buckle male portion resilient lower leg 24F has a belt buckle male portion lower leg distal end 24FA with a belt buckle male portion lower leg distal end lip 24FAA extending downwardly therefrom.

Upon securing the belt 20 around the waist of the user 14, the buckle male portion resilient upper leg 24D, the buckle male male portion resilient intermediate leg 24E, and the buckle male portion resilient lower leg 24F are inserted into the buckle female portion 22 where by virtue of the resiliency of the buckle male portion resilient upper leg 24D and the buckle male portion resilient lower leg 24F, they will initially displace towards each other. Once the buckle male portion resilient upper leg 24D, the buckle male resilient intermediate leg 24E, and the buckle male portion resilient lower leg 24F are completely inserted in the buckle female portion 22, the buckle male portion resilient upper leg 24D and the belt buckle male portion resilient lower leg 24F will displace away from each other with the belt buckle male portion upper leg distal end lip 24DAA and the belt buckle male portion lower leg distal end lip 24FAA securing it therein.

As can be seen in FIG. 6, the resilient insert 32 is positioned internal to the tube 28 and by compression allows for the removable securing of the handle 16 of the golf cart 18 within the tube 28 while also protecting the handle 16 from damage.

The tube 28 is made from poly-vinyl chloride. As can be seen in FIG. 2, the tube 28 is horizontally positioned at the belt outer surface 20A by an elastic strip 26 which includes an elastic strip first distal end 26A and an elastic strip second distal end 26B. The elastic strip 26 passes freely through the tube 28 which the elastic strip first distal end 26A and the elastic strip second distal end 26B attached to the belt outer surface 20A by securing means comprising elastic strip first distal end stitches 26AA and elastic strip second distal end stitches 26BA, rspectively, such that the tube 28 is located intermediate the elastic strip first distal end 26A and the elastic strip second distal end 26B so that the tube 28, which removably recieves the handle 16 of the golf cart 18 therein, can move readily with rspect to the belt 20. The elastic strip 26 helps to prevent a force encountered by the golf cart 18 due to the many variations in terrain encountered by the golf cart 18 during its towing by the user 14 from being transmitted to the user 14.

It will be understood that each of the elements described above, or two or more together, may also find a useful application in other types of constructions differing from the types described above.

While the invention has been illustrated and described as embodied in a golf cart towing device, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

I claim:

1. A golf cart towing device for towing a hand pulled golf cart having a handle extending therefrom, said device comprising:
   a) a belt adapted to be worn about the waist of a user having a belt outer surface, a belt inner surface, a belt first distal end, and a belt second distal end;
   b) an adjusting ring having an adjusting ring inner post and an adjusting ring outer post, said adjusting ring inner post and said adjusting ting outer post defining an adjusting ting slot therebetween throughwhich said belt passes so that said belt can be quickly adjusted to accommodate for different sized waists;
   c) a buckle female portion containing a vertically disposed buckle female portion slot through which said belt first distal end passes;
   d) a buckle male portion having a buckle male portion body containing a buckle male portion inner slot, a buckle male portion outer slot, and a buckle male portion partition separating said buckle male portion inner slot from said buckle male portion outer slot, said belt second distal end passing through said buckle male portion inner slot, around said buckle male portion partition, through said buckle male portion outer slot, around said adjusting ring outer post where it is secured therearound;
   e) a tube horizontally positioned at said belt outer surface intermediate said belt first distal end and said belt second distal end and movable therefrom, said tube removably receiving the handle of a golf cart; and
   f) said tube being positioned at said belt outer surface by an elastic strip having an elastic strip first distal end and an elastic strip second distal end, said elastic strip passing freely through said robe with said elastic strip first distal end and said elastic strip second distal end attached to said belt outer surface so that said tube can move readily with respect to said belt without imparting a force to said belt, said elastic strip preventing a force encountered by said golf cart due to the many variations in terrain encountered by the golf cart during its towing by said user from being transmitted to the user.

2. The device as defined in claim 1, further comprising belt first distal end securing means for securing said belt first distal end to said belt inner surface.

3. The device as defined in claim 2, wherein said belt first distal end securing means includes belt first distal end stitches.

4. The device as defined in claim 1, further comprising belt second distal end securing means for securing said belt second distal end around said adjusting ring outer post.

5. The device as defined in claim 4, wherein said belt second distal end securing means includes belt second distal end stitches.

6. The device as defined in claim 1, further comprising elastic strip first distal end securing means for securing said elastic strip first distal end to said belt outer surface.

7. The device as defined in claim 6, wherein said elastic strip first distal end securing means includes elastic strip first distal end stitches.

8. The device as defined in claim 1, further comprising elastic strip second distal end securing means for securing said elastic strip second distal end to said belt outer surface.

9. The device as defined in claim 8, wherein said elastic strip second distal end securing means includes elastic strip second distal end stitches.

10. The device as defined in claim 1, wherein said buckle male portion further has a buckle male portion resilient upper leg, a buckle male resilient male portion intermediate leg, and a buckle male portion resilient lower leg that extend from said buckle male portion body.

11. The device as defined in claim 10, wherein said buckle male portion upper leg has a buckle male portion upper leg distal end with a buckle male portion upper leg distal end lip that extends upwardly therefrom.

12. The device as defined in claim 11, wherein said buckle male portion lower leg has a buckle male portion lower leg distal end with a buckle male portion lower leg distal end lip that extends downwardly therefrom.

13. The device as defined in claim 1, wherein said robe is polyvinyl-chloride.

14. The device as defined in claim 12, wherein said buckle male portion body, said belt buckle male portion resilient upper leg, said belt buckle male resilient male portion intermediate leg, said a belt buckle male portion resilient lower leg, said belt buckle male portion upper leg distal end lip, and said belt buckle male portion lower leg distal end lip are integrally formed.

* * * * *